April 14, 1936.  W. F. DEHUFF  2,037,068
BEATER FOR MIXING MACHINES
Filed Oct. 20, 1934
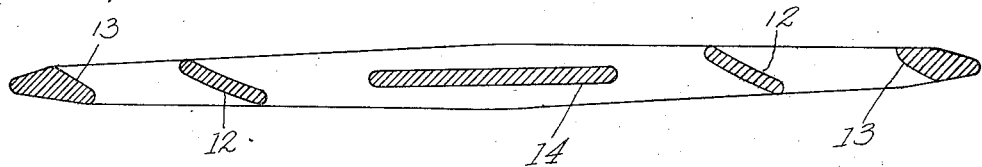
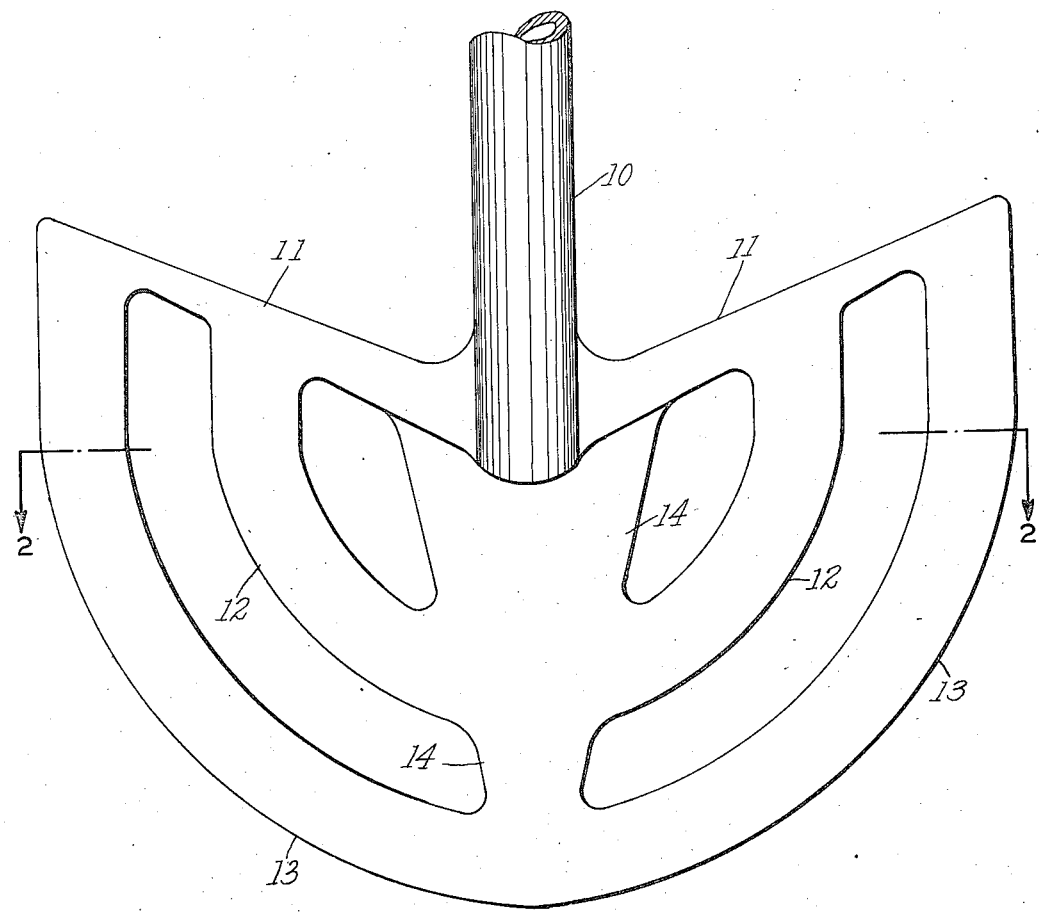

Patented Apr. 14, 1936

2,037,068

UNITED STATES PATENT OFFICE 2,037,068

BEATER FOR MIXING MACHINES

Walter F. Dehuff, Glen Rock, Pa., assignor to American Machine & Foundry Company, a corporation of New Jersey Application October 20, 1934, Serial No. 749,302

1 Claim. (Cl. 259—133)

This invention relates to machines for mixing dough, batter and the like, and more particularly to the beaters of such machines.

The main object of the invention is to secure a more thorough mixing of the dough or batter, and for this purpose there is provided a beater head having a drop center construction of heart-shaped section, the driving shank being joined to the reentrant portion of the heart. With this and other objects not specifically mentioned in view, the invention consists in certain constructions and combinations hereinafter fully described and then specifically set forth in the claim hereunto appended.

In the accompanying drawing which forms a part of this specification and in which like characters of reference indicate the same or like parts:

Fig. 1 is a partial side elevation of the improved beater used for heavy batches; and Fig. 2 is a sectional plan view taken on line 2—2 of the beater shown in Fig. 1.

In carrying the invention into effect there is provided a driving shank and a heart-shaped beater head supported on said shank with its obtuse end downward and adapted to create a circulation of the mix down through the center of the head when the same is rotated in the mix. In the best constructions contemplated, the beater head may include a pair of opposite upwardly inclined bars on the shank, a central web forming a drop center continuation of the shank, and two sets of curved members joining the bars and web. These various means and parts may be widely varied in construction within the scope of the claim for the particular device selected to illustrate the invention is merely illustrative of the many possible concrete embodiments of the same. The invention, therefore, is not to be restricted to the specific construction shown and described.

Referring to Figs. 1 and 2, the beater consists of a driving shank 10 which is adapted to be connected to the beater spindle of the mixing machine, and a beater head of approximately heart-shaped section integral with or attached to the driving shank. In the embodiment of the invention shown in Figs. 1 and 2 the beater head consists of two diametrically opposite upwardly inclined top bars 11 which extend from the driving shank and are connected by inner curved members 12 and outer curved members 13 to a central web 14 which forms a drop center continuation of the shank 10. The inner members 12 are set obliquely to the central web 14, as shown in Fig. 2, to assure effective stirring of the batch being mixed.

The object of the drop center is to create a flow of material from the outside down through the center of the beater to the bottom of the mixing bowl, creating a circulation of the batch which of course means more thorough and rapid assimilation and the working of the various materials into a finished state or condition. This construction also assures a more rapid assimilation of materials which have to be added to the batch as the mixing of the batch progresses.

The beater illustrated in Fig. 1 is used mostly for creaming, mixing and "folding-in" flour in batches of all kinds. The drop center construction eliminates the standard heavy bar sloping downwardly from the beater shank as in previous beaters which had a tendency to trap the material at the center of the batch being mixed and keep it floating on top of the batch. The drop center construction breaks up this peculiar condition, and in fact avoids it entirely by reason of the top bars 11 being inclined downward toward the shank, thus allowing the material at the center of the batch to flow down to the bottom of the mixing bowl.

What is claimed is:

In a beater, the combination with a driving shank, of a heart-shaped beater head supported on said shank with its obtuse end downward, said beater head including a pair of opposite upwardly inclined bars on said shank, a flat central web forming a drop center continuation of said shank and adapted to produce cavitation in and thereby create a circulation of the mix from the outside of the beater head down through the center of the head when the same is rotated in the mix, and two sets of curved members of different radii joining said bars and web, the inner set of members being oblique to the web to assure effective stirring of the mix.

WALTER F. DEHUFF.